US012652180B2

(12) United States Patent
Yang

(10) Patent No.: US 12,652,180 B2
(45) Date of Patent: Jun. 9, 2026

(54) METHOD, APPARATUS, DEVICE, AND STORAGE MEDIUM FOR DATA PROCESSING

(71) Applicant: Douyin Vision Co., Ltd., Beijing (CN)

(72) Inventor: Xinying Yang, Beijing (CN)

(73) Assignee: Douyin Vision Co., Ltd., Beijing (CN)

( * ) Notice: Subject to any disclaimer, the term of this patent is extended or adjusted under 35 U.S.C. 154(b) by 45 days.

(21) Appl. No.: 18/859,055

(22) PCT Filed: Aug. 25, 2023

(86) PCT No.: PCT/CN2023/115057
§ 371 (c)(1),
(2) Date: Oct. 22, 2024

(87) PCT Pub. No.: WO2024/078156
PCT Pub. Date: Apr. 18, 2024

(65) Prior Publication Data
US 2025/0279902 A1 Sep. 4, 2025

(30) Foreign Application Priority Data
Oct. 11, 2022 (CN) .......................... 202211242214.0

(51) Int. Cl.
*H04L 9/32* (2006.01)
*G06F 16/23* (2019.01)
*H04L 9/00* (2022.01)
(52) U.S. Cl.
CPC ........ *H04L 9/3297* (2013.01); *G06F 16/2322* (2019.01); *H04L 9/50* (2022.05)

(58) Field of Classification Search
CPC ...... H04L 9/3297; H04L 9/50; G06F 16/2322
(Continued)

(56) References Cited

U.S. PATENT DOCUMENTS 8,392,709 B1 * 3/2013 Agrawal ............... H04L 9/3228
713/169
9,553,982 B2 * 1/2017 Unitt ..................... H04L 9/0643
(Continued)

FOREIGN PATENT DOCUMENTS

CN 111183446 A 5/2020
CN 111447068 A 7/2020
(Continued)

OTHER PUBLICATIONS

Notification to Grant received from Chinese patent application No. 202211242214.0 mailed on Dec. 12, 2025, 6 pages. (2 pages English Translation and 4 pages Original Copy).

*Primary Examiner* — Dereena T Cattungal

(57) ABSTRACT
The disclosure provides a method, apparatus, a device, and a storage medium for data processing. The method may: in response to a time query request for target data, determining a target upload time of the target data; obtaining a first time-assigned timestamp that is assigned by a time stamping end to first relay data after a relay database uploads the first relay data to the time stamping end for a first time; obtaining a second time-assigned timestamp indicated by last time-assigned data received from the time stamping end before the relay database sends target return data; and determining a trusted time domain of the target data based on the first time-assigned timestamp and the second time-assigned timestamp.

18 Claims, 5 Drawing Sheets

(58) Field of Classification Search
USPC .......................................................... 713/178
See application file for complete search history.

(56)                     References Cited

U.S. PATENT DOCUMENTS

| | | | | |
|---|---|---|---|---|
| 10,305,694 B2 * | 5/2019 | Dix ......................... | H04L 9/3239 |
| 10,476,665 B1 * | 11/2019 | Griffin .................. | H04L 9/3263 |
| 10,581,591 B1 * | 3/2020 | Branton ................ | H04L 9/3239 |
| 10,686,590 B2 * | 6/2020 | Santilli ................... | G06F 16/23 |
| 10,728,036 B2 * | 7/2020 | Ganesan ............... | H04L 9/3239 |
| 10,924,288 B2 * | 2/2021 | Yan ......................... | G06F 21/725 |
| 11,121,870 B2 * | 9/2021 | Sengupta ............. | G06Q 20/065 |
| 11,249,977 B2 * | 2/2022 | Kohli .................... | H04L 9/3247 |
| 11,775,553 B2 * | 10/2023 | Panda ................... | G06F 16/275 |
| | | | 707/661 |
| 2020/0169425 A1 | 5/2020 | Hofstee et al. | |
| 2020/0394652 A1 * | 12/2020 | Youb ....................... | G06Q 50/16 |
| 2023/0089235 A1 * | 3/2023 | Zhang ....................... | H04L 9/50 |
| | | | 705/75 |

FOREIGN PATENT DOCUMENTS

| | | |
|---|---|---|
| CN | 112364382 A | 2/2021 |
| CN | 112487084 A | 3/2021 |
| CN | 112364382 B | 4/2021 |
| KR | 2022-0020572 A | 2/2022 |

* cited by examiner

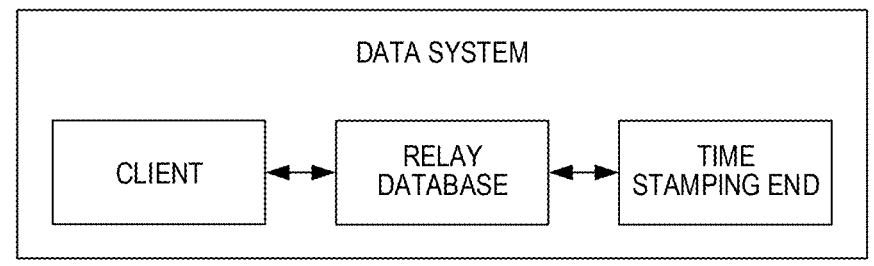

FIG. 1

CLIENT      RELAY DATABASE      TIME STAMPING END

UPLOAD TRANSACTION DATA

CONVERT THE RECEIVED TRANSACTION DATA INTO CORRESPONDING RELAY DATA AND WRITE THE RELAY DATA

SEND THE RELAY DATA

ASSIGN A TIME-ASSIGNED TIMESTAMP TO THE RECEIVED RELAY DATA

RETURN TIME SERVICE DATA OBTAINED THROUGH THE RELAY DATA AND THE CORRESPONDING TIME SERVICE DATA

OBTAIN AND WRITE RETURN DATA BASED ON THE RECEIVED TIME SERVICE DATA AND THE CORRESPONDING RELAY DATA

SEND RETURN DATA

UPDATE TRANSACTION DATA CORRESPONDING TO THE RETURN DATA

FIG. 2

IN RESPONSE TO A TIME QUERY REQUEST FOR TARGET DATA, DETERMINE A TARGET UPLOAD TIME OF THE TARGET DATA, THE TARGET DATA BEING ANY ONE OF A PLURALITY OF PIECES OF TRANSACTION DATA THAT ARE UPLOADED BY A CLIENT TO A BLOCKCHAIN

S301

OBTAIN, BASED ON A TIME SEQUENCE IN WHICH RESPECTIVE PIECES OF TRANSACTION DATA ARE UPLOADED, A FIRST TIMESTAMP THAT IS TIME-ASSIGNED BY A TIME STAMPING END TO FIRST RELAY DATA AFTER A RELAY DATABASE UPLOADS THE FIRST RELAY DATA TO THE TIME STAMPING END FOR A FIRST TIME, THE FIRST RELAY DATA BEING UPLOADED BY THE RELAY DATABASE AFTER RECEIVING FIRST UPLOAD DATA UPLOADED BY THE CLIENT, THE FIRST UPLOAD DATA BEING DATA SENT BY THE CLIENT TO THE RELAY DATABASE FOR A FIRST TIME AFTER THE TARGET DATA IS UPLOADED TO A BLOCKCHAIN

S302

OBTAIN, BASED ON FIRST RECEPTION TIMES OF RESPECTIVE PIECES OF RETURN DATA RECEIVED FROM THE RELAY DATABASE AND THE TARGET UPLOAD TIME, A SECOND TIME-ASSIGNED TIMESTAMP INDICATED BY LAST TIME-ASSIGNED DATA RECEIVED FROM THE TIME STAMPING END BEFORE THE RELAY DATABASE SENDS TARGET RETURN DATA, THE TARGET RETURN DATA BEING DATA LAST RECEIVED BY THE CLIENT FROM THE RELAY DATABASE BEFORE THE TARGET UPLOAD TIME

S303

DETERMINE A TRUSTED TIME DOMAIN OF THE TARGET DATA BASED ON THE FIRST TIME-ASSIGNED TIMESTAMP AND THE SECOND TIME-ASSIGNED TIMESTAMP

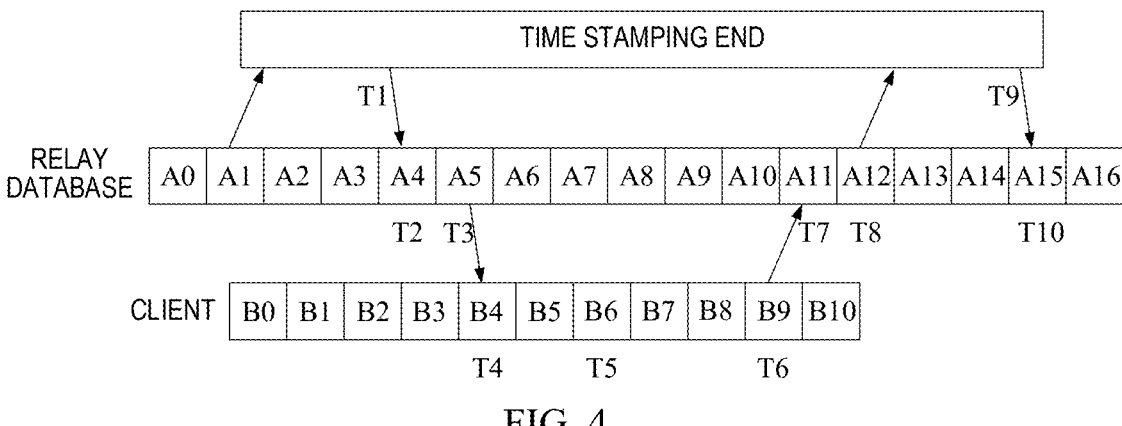

FIG. 4

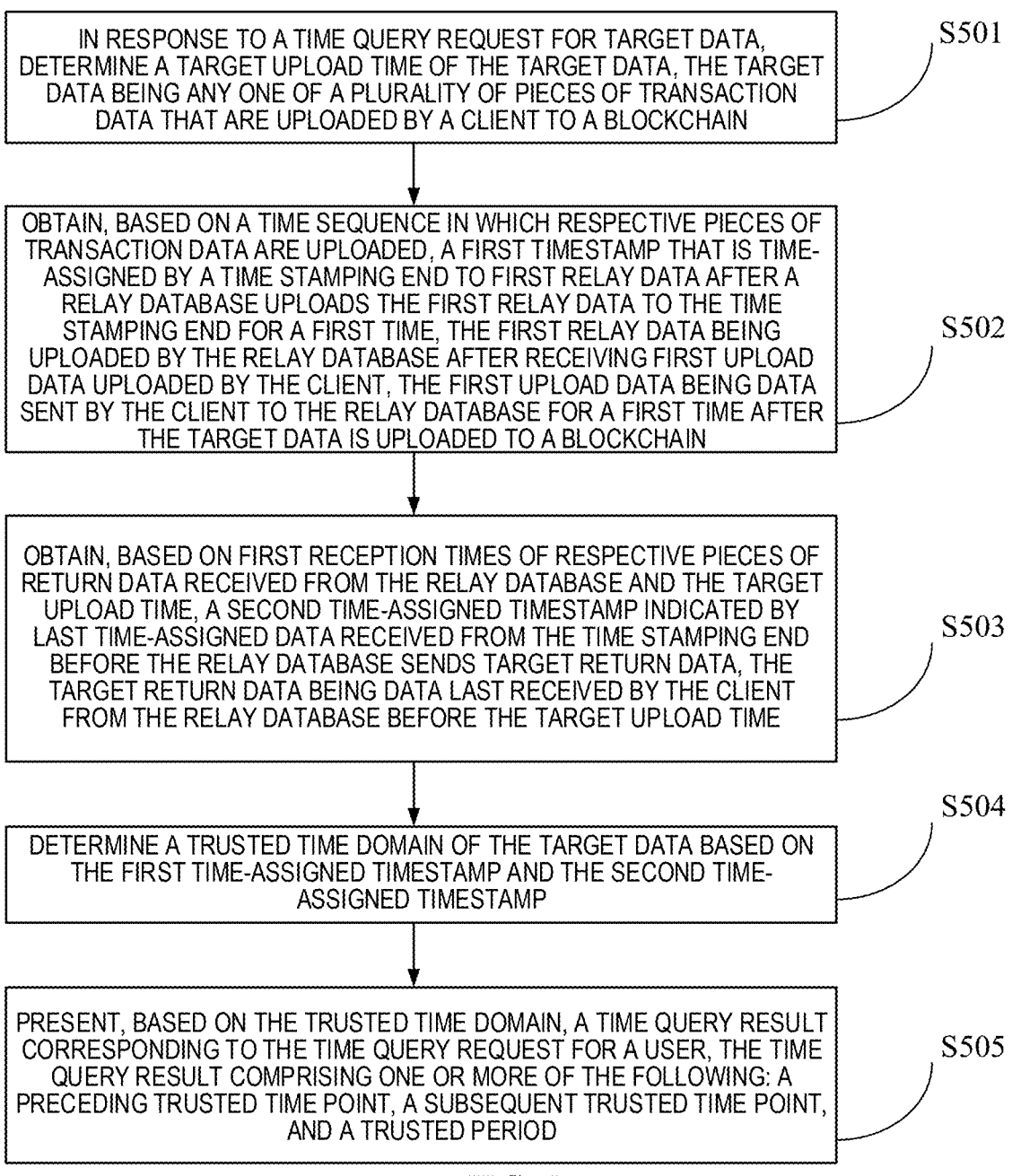

IN RESPONSE TO A TIME QUERY REQUEST FOR TARGET DATA, DETERMINE A TARGET UPLOAD TIME OF THE TARGET DATA, THE TARGET DATA BEING ANY ONE OF A PLURALITY OF PIECES OF TRANSACTION DATA THAT ARE UPLOADED BY A CLIENT TO A BLOCKCHAIN — S501

OBTAIN, BASED ON A TIME SEQUENCE IN WHICH RESPECTIVE PIECES OF TRANSACTION DATA ARE UPLOADED, A FIRST TIMESTAMP THAT IS TIME-ASSIGNED BY A TIME STAMPING END TO FIRST RELAY DATA AFTER A RELAY DATABASE UPLOADS THE FIRST RELAY DATA TO THE TIME STAMPING END FOR A FIRST TIME, THE FIRST RELAY DATA BEING UPLOADED BY THE RELAY DATABASE AFTER RECEIVING FIRST UPLOAD DATA UPLOADED BY THE CLIENT, THE FIRST UPLOAD DATA BEING DATA SENT BY THE CLIENT TO THE RELAY DATABASE FOR A FIRST TIME AFTER THE TARGET DATA IS UPLOADED TO A BLOCKCHAIN — S502

OBTAIN, BASED ON FIRST RECEPTION TIMES OF RESPECTIVE PIECES OF RETURN DATA RECEIVED FROM THE RELAY DATABASE AND THE TARGET UPLOAD TIME, A SECOND TIME-ASSIGNED TIMESTAMP INDICATED BY LAST TIME-ASSIGNED DATA RECEIVED FROM THE TIME STAMPING END BEFORE THE RELAY DATABASE SENDS TARGET RETURN DATA, THE TARGET RETURN DATA BEING DATA LAST RECEIVED BY THE CLIENT FROM THE RELAY DATABASE BEFORE THE TARGET UPLOAD TIME — S503

DETERMINE A TRUSTED TIME DOMAIN OF THE TARGET DATA BASED ON THE FIRST TIME-ASSIGNED TIMESTAMP AND THE SECOND TIME-ASSIGNED TIMESTAMP — S504

PRESENT, BASED ON THE TRUSTED TIME DOMAIN, A TIME QUERY RESULT CORRESPONDING TO THE TIME QUERY REQUEST FOR A USER, THE TIME QUERY RESULT COMPRISING ONE OR MORE OF THE FOLLOWING: A PRECEDING TRUSTED TIME POINT, A SUBSEQUENT TRUSTED TIME POINT, AND A TRUSTED PERIOD — S505

METHOD, APPARATUS, DEVICE, AND STORAGE MEDIUM FOR DATA PROCESSING

The present application claims priority to Chinese Patent Application No. 202211242214.0, filed on Oct. 11, 2022, and entitled 'METHOD, APPARATUS, DEVICE, AND STORAGE MEDIUM FOR DATA PROCESSING', which is incorporated herein by reference in its entirety.

FIELD

The present disclosure relates to the field of information technologies, and in particular, to a method, apparatus, device, and storage medium for data processing.

BACKGROUND

With the advent of the big data era, requirements for data storage management are also increasing. Data is stored and managed by using a blockchain-type database, for example, a trusted ledger database (LedgerDB), and is widely used in big data scenarios. The database may receive data uploaded by a user, and after performing specific conversion processing on the received data, perform blockchain-type write management. The database records a trusted timestamp (Timestamp Authority, TSA), to implement strong external auditing. In addition, TWO-WAY PEGs between a trusted time service and respective blockchain nodes are introduced, and the database has a trusted time nature.

During data storage management performed by using the blockchain-type database, for respective pieces of data uploaded by the user, only a rough period is mostly provided to represent a time range to which a notarization time of the data belongs. The period may have a low degree of association with the data itself, and the credibility of representing the notarization time of the data is not high.

SUMMARY

Embodiments of the present disclosure provide at least a method, apparatus, device, and storage medium for data processing.

An embodiment of the present disclosure provides a method of data processing, and the method includes:

in response to a time query request for target data, determining a target upload time of the target data, the target data being any one of a plurality of pieces of transaction data that are uploaded by a client to a blockchain;

obtaining, based on a time sequence in which respective pieces of transaction data are uploaded, a first time-assigned timestamp that is time-assigned by a time stamping end to first relay data after a relay database uploads the first relay data to the time stamping end for a first time, the first relay data being uploaded by the relay database after receiving first upload data uploaded by the client, the first upload data being data sent by the client to the relay database for a first time after the target data is uploaded to a blockchain;

obtaining, based on first reception times of respective pieces of return data received from the relay database and the target upload time, a second time-assigned timestamp indicated by last time-assigned data received from the time stamping end before the relay database sends target return data, the target return data being data last received by the client from the relay database before the target upload time; and determining a trusted time domain of the target data based on the first time-assigned timestamp and the second time-assigned timestamp.

In an optional implementation, obtaining, based on a time sequence in which respective pieces of transaction data are uploaded, a first time-assigned timestamp that is time-assigned by a time stamping end to first relay data after a relay database uploads the first relay data to the time stamping end for a first time, the first relay data being uploaded by the relay database after receiving first upload data uploaded by the client includes:

determining, for a plurality of pieces of transaction data that are uploaded to a blockchain, a time sequence in which respective pieces of transaction data among the plurality of pieces of transaction data based on upload times of respective pieces of transaction data;

determining, based on the time sequence in which respective pieces of transaction data are uploaded, the first upload data from the plurality of pieces of transaction data that is first sent by the client to the relay database after the target data is uploaded to a blockchain; and determining, for a plurality of pieces of relay data stored in the relay database, first relay data that is first uploaded to the time stamping end after receiving the first upload data, based on a first sending time when the relay database sends respective pieces of relay data to the time stamping end, and determining a first time-assigned timestamp that is time-assigned by the time stamping end to the first relay data, the plurality of pieces of relay data comprising relay data obtained after processing of the first upload data by the relay database.

In an optional implementation, determining first relay data that is first uploaded to the time stamping end after receiving the first upload data, based on a first sending time when the relay database sends respective pieces of relay data to the time stamping end, and determining a first time-assigned timestamp that is time-assigned by the time stamping end to the first relay data includes:

obtaining a second reception time when the relay database receives the first upload data and the first sending time corresponding to a time when the relay database sends respective pieces of stored relay data to the time stamping end;

determining, based on respective ones of the obtained first sending times and second reception time, a first target sending time in at least one first sending time after the second reception time, a time difference between the first target sending time and the second reception time being the smallest;

determining, from the plurality of pieces of relay data, first relay data uploaded to the time stamping end at the first target sending time; and obtaining the first time-assigned timestamp that is time-assigned by the time stamping end to the first relay data.

In an optional implementation, obtaining, based on first reception times of respective pieces of return data received from the relay database and the target upload time, a second time-assigned timestamp indicated by last time-assigned data received from the time stamping end before the relay database sends target return data includes:

obtaining first reception times of respective pieces of return data received from the relay database, the return data being data obtained by the relay database through the relay data and a time-assigned timestamp corresponding to the relay data, the time-assigned timestamp being time data that is obtained from time-assigned data corresponding to the relay data and is received from the time stamping end;

determining, based on respective first reception times and the target upload time, the target return data that is last received by the client from the relay database before the target upload time;

obtaining third reception times corresponding to times when the relay database receives respective pieces of time-assigned data returned by the time stamping end, and a second target sending time when the relay database sends the target return data, the time-assigned data being data obtained by the time stamping end based on the received relay data and a time-assigned timestamp that is time-assigned to the relay data; and determining, based on respective ones of the obtained third reception times and second target sending time, a last time-assigned data received before the relay database sends the target return data, and a second time-assigned timestamp comprised in the last time-assigned data.

In an optional implementation, determining, based on respective ones of the obtained third reception times and second target sending time, a last time-assigned data received before the relay database sends the target return data, and a second time-assigned timestamp comprised in the last time-assigned data includes:

determining, based on respective ones of the obtained third reception times and second target sending time, a third target reception time in at least one third reception time before the second target sending time, a time difference between the third target reception time and the second target sending time being the smallest;

determining time-assigned data sent by the time stamping end and received by the relay database at the third target reception time as the last time-assigned data received; and determining the second time-assigned timestamp comprised in the last time-assigned data.

In an optional implementation, after determining a trusted time domain of the target data based on the first time-assigned timestamp and the second time-assigned timestamp, the method further includes:

presenting, based on the trusted time domain, a time query result corresponding to the time query request for a user, the time query result comprising one or more of the following: a preceding trusted time point, a subsequent trusted time point, and a trusted period.

In an optional implementation, the method further includes:

receiving transaction data uploaded by a user, performing blockchain upload processing on the transaction data to obtain a plurality of pieces of transaction data that is uploaded to a blockchain;

uploading transaction data that performs blockchain uploading to the relay database, the relay database being capable of converting the received transaction data into corresponding relay data and writing the relay data into the relay database, and forwarding the relay data to the time stamping end, the time stamping end being capable of time-assigning to the received relay data to obtain a time-assigned timestamp, and returning time-assigned data obtained through the relay data and the corresponding time-assigned timestamp to the relay database, and after receiving the time-assigned data returned by the time stamping end, the relay database being capable of obtaining return data based on the received time-assigned data and the corresponding relay data, writing the return data into the relay database, and returning the obtained return data to the client; and receiving the return data returned by the relay database.

In an optional implementation, after receiving the return data returned by the relay database, the method further includes:

updating, based on the received return data, transaction data corresponding to the return data.

An embodiment of the present disclosure further provides an apparatus for data processing, and the apparatus includes:

a time determining module configured to, in response to a time query request for target data, determine a target upload time of the target data, the target data being any one of a plurality of pieces of transaction data that are uploaded by a client to a blockchain;

a first data obtaining module configured to obtain, based on a time sequence in which respective pieces of transaction data are uploaded, a first time-assigned timestamp that is time-assigned by a time stamping end to first relay data after a relay database uploads the first relay data to the time stamping end for a first time, the first relay data being uploaded by the relay database after receiving first upload data uploaded by the client, the first upload data being data sent by the client to the relay database for a first time after the target data is uploaded to a blockchain;

a second data obtaining module configured to obtain, based on first reception times of respective pieces of return data received from the relay database and the target upload time, a second time-assigned timestamp indicated by last time-assigned data received from the time stamping end before the relay database sends target return data, the target return data being data last received by the client from the relay database before the target upload time; and a time domain determining module configured to determine a trusted time domain of the target data based on the first time-assigned timestamp and the second time-assigned timestamp.

In an optional implementation, the first data obtaining module is specifically configured to:

determine, for a plurality of pieces of transaction data that are uploaded to a blockchain, a time sequence in which respective pieces of transaction data among the plurality of pieces of transaction data based on upload times of respective pieces of transaction data;

determine, based on the time sequence in which respective pieces of transaction data are uploaded, the first upload data from the plurality of pieces of transaction data that is first sent by the client to the relay database after the target data is uploaded to a blockchain; and determine, for a plurality of pieces of relay data stored in the relay database, first relay data that is first uploaded to the time stamping end after receiving the first upload data, based on a first sending time when the relay database sends respective pieces of relay data to the time stamping end, and determining a first time-assigned timestamp that is time-assigned by the time stamping end to the first relay data, the plurality of pieces of relay data comprising relay data obtained after processing of the first upload data by the relay database.

In an optional implementation, when the first data obtaining module is configured to determine first relay data that is first uploaded to the time stamping end after receiving the first upload data, based on a first sending time when the relay database sends respective pieces of relay data to the time stamping end, and determining a first time-assigned timestamp that is time-assigned by the time stamping end to the first relay data, the first data obtaining module is specifically configured to:

obtain a second reception time when the relay database receives the first upload data and the first sending time corresponding to a time when the relay database sends respective pieces of stored relay data to the time stamping end;

determine, based on respective ones of the obtained first sending times and second reception time, a first target sending time in at least one first sending time after the second reception time, a time difference between the first target sending time and the second reception time being the smallest;

determine, from the plurality of pieces of relay data, first relay data uploaded to the time stamping end at the first target sending time; and obtain the first time-assigned timestamp that is time-assigned by the time stamping end to the first relay data.

In an optional implementation, the second data obtaining module is specifically configured to:

obtain first reception times of respective pieces of return data received from the relay database, the return data being data obtained by the relay database through the relay data and a time-assigned timestamp corresponding to the relay data, the time-assigned timestamp being time data that is obtained from time-assigned data corresponding to the relay data and is received from the time stamping end;

determine, based on respective first reception times and the target upload time, the target return data that is last received by the client from the relay database before the target upload time;

obtain third reception times corresponding to times when the relay database receives respective pieces of time-assigned data returned by the time stamping end, and a second target sending time when the relay database sends the target return data, the time-assigned data being data obtained by the time stamping end based on the received relay data and a time-assigned timestamp that is time-assigned to the relay data; and determine, based on respective ones of the obtained third reception times and second target sending time, a last time-assigned data received before the relay database sends the target return data, and a second time-assigned timestamp comprised in the last time-assigned data.

In an optional implementation, when the second data obtaining module is configured to determine, based on respective ones of the obtained third reception times and second target sending time, a last time-assigned data received before the relay database sends the target return data, and a second time-assigned timestamp comprised in the last time-assigned data, the second data obtaining module is specifically configured to:

determine, based on respective ones of the obtained third reception times and second target sending time, a third target reception time in at least one third reception time before the second target sending time, a time difference between the third target reception time and the second target sending time being the smallest;

determine time-assigned data sent by the time stamping end and received by the relay database at the third target reception time as the last time-assigned data received; and determine the second time-assigned time-stamp comprised in the last time-assigned data.

In an optional implementation, the apparatus further includes a result presenting module, and the result presenting module is configured to:

present, based on the trusted time domain, a time query result corresponding to the time query request for a user, the time query result comprising one or more of the following: a preceding trusted time point, a subsequent trusted time point, and a trusted period.

In an optional implementation, the apparatus further includes a data processing module, and the data processing module is configured to:

receive transaction data uploaded by a user, perform blockchain upload processing on the transaction data to obtain a plurality of pieces of transaction data that is uploaded to a blockchain;

upload transaction data that performs blockchain uploading to the relay database, the relay database being capable of converting the received transaction data into corresponding relay data and writing the relay data into the relay database, and forwarding the relay data to the time stamping end, the time stamping end being capable of time-assigning to the received relay data to obtain a time-assigned timestamp, and returning time-assigned data obtained through the relay data and the corresponding time-assigned timestamp to the relay database, and after receiving the time-assigned data returned by the time stamping end, the relay database being capable of obtaining return data based on the received time-assigned data and the corresponding relay data, writing the return data into the relay database, and returning the obtained return data to the client; and receive the return data returned by the relay database.

In an optional implementation, the data processing module is further configured to:

update, based on the received return data, transaction data corresponding to the return data.

An embodiment of the present disclosure further provides an electronic device, comprising: a processor, a memory, and a bus, the memory storing machine-readable instructions executable by the processor, when the electronic device is running, the processor communicating with the memory through the bus, and the machine-readable instructions, when executed by the processor, performing the steps of the foregoing method of data processing An embodiment of the present disclosure further provides a computer-readable storage medium having a computer program stored thereon, the computer program, when executed by a processor, performing the steps of the foregoing method of data processing.

For an effect description of the foregoing apparatus for data processing, the electronic device, and the computer-readable storage medium, refer to the description of the method of data processing. Details are not described herein again.

In the embodiments of the present disclosure, in response to a time query request for target data, a target upload time of the target data may be determined. A first time-assigned timestamp is obtained based on a time sequence in which respective pieces of transaction data are uploaded, the first time-assigned timestamp being time-assigned by a time stamping end to first relay data after a relay database uploads the first relay data to the time stamping end for a first time, the first relay data being uploaded by the relay database after receiving first upload data uploaded by the client. A second time-assigned timestamp is obtained based on first reception times of respective pieces of return data received from the relay database and the target upload time, the second time-assigned timestamp being indicated by last time-assigned data received from the time stamping end before the relay database sends target return data. Therefore, a trusted time domain of the target data may be determined based on the first time-assigned timestamp and the second time-assigned timestamp.

In this way, in the case where a time query request is received for the target data, backtracking can be performed step-by-step based on the chronological order according to the target upload time of the target data, the time sequence of uploading of the respective pieces of transaction data, and the reception time of the respective pieces of return data received from the relay database in accordance with the process of data interaction. The time-assigned timestamps time-assigned by the time stamping end before and after the target data are obtained, so that the trusted time domain of the target data can be determined. For the target data, on the basis of the actual data interaction process, by means of this step-by-step search, the respective steps in the process of determining the trusted time domain are guaranteed to be traceable, so as to be able to obtain a trusted time domain that can be used to represent the notarization time of the data.

Furthermore, a degree of association between a determined time-assigned timestamp and the target data can be improved, and strictness and credibility of the trusted time domain can be effectively improved.

To make the above objectives, features, and advantages of the present disclosure clearer and more comprehensible, the following describes preferred embodiments in detail with reference to the accompanying drawings.

It should be understood that the foregoing general description and the following detailed description are merely exemplary and explanatory, rather than limiting the technical solutions of the present disclosure.

BRIEF DESCRIPTION OF THE DRAWINGS

In order to more clearly describe the technical solutions in the embodiments of the present disclosure, the drawings used in the description of the embodiments are briefly described below. The drawings in the description show the embodiments consistent with the present disclosure and are used together with the description to describe the technical solutions of the present disclosure. It should be understood that the following drawings show only some embodiments of the present disclosure, and therefore should not be regarded as limiting the scope. For those of ordinary skill in the art, other related drawings may be derived from these drawings without creative efforts.

FIG. 1 is a schematic diagram of a data system according to an embodiment of the present disclosure;

FIG. 2 is a schematic diagram of a data exchange process according to an embodiment of the present disclosure;

FIG. 3 is a flowchart of a method of data processing according to an embodiment of the present disclosure;

FIG. 4 is a schematic diagram of a data processing process according to an embodiment of the present disclosure;

FIG. 5 is a flowchart of a further method of data processing according to an embodiment of the present disclosure;

DETAILED DESCRIPTION

Figure 6:
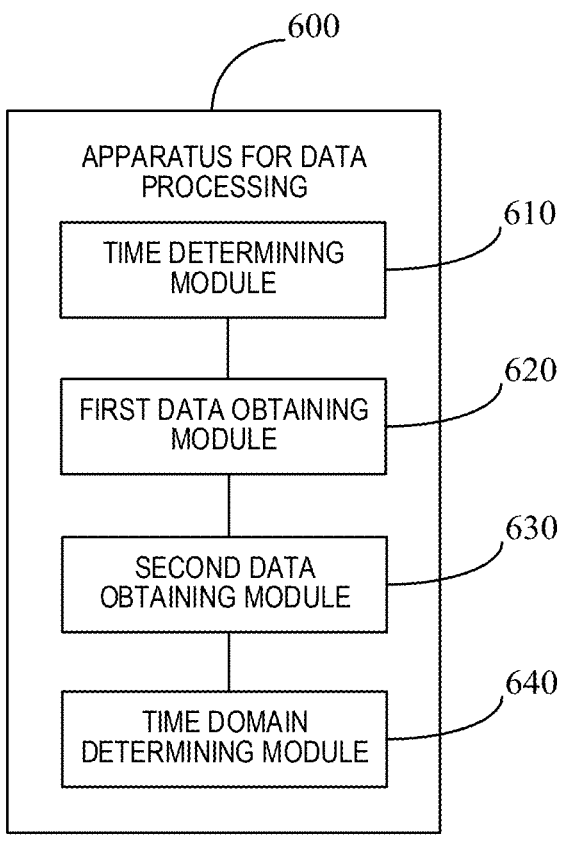
FIG. 6 is a schematic diagram of an apparatus for data processing according to an embodiment of the present disclosure.

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be noted that like reference numerals and letters denote like items in the following drawings, and therefore, once an item is defined in one drawing, it is not required to be further defined and explained in subsequent drawings.

The term 'and/or' in this specification merely describes an association relationship and indicates that three relationships may exist. For example, A and/or B may indicate the following three cases: Only A exists, both A and B exist, and only B exists. In addition, the term 'at least one' in this specification indicates any one of a plurality of or any combination of at least two of a plurality of. For example, at least one of A, B, and C may indicate any element selected from a set consisting of A, B, and C, or any combination of at least two elements in the set consisting of A, B, and C.

It is found through research that in a process of data storage management performed by using a blockchain-type database, to determine a time range to which a notarization time of respective pieces of data uploaded by a user belongs, data in the database to which the user upload data will be converted and written is mostly determined, and then a corresponding trusted time domain is delimited based on a latest time-assigned timestamp received before the data and a latest time-assigned timestamp received after the data. However, this method of determination is relatively rough, and a time span of the determined trusted time domain may be large, and a degree of association with the data itself is weak.

In view of the defects that the trusted time domain determined in the conventional manner is relatively rough and has a low degree of association with the data uploaded by the user, the present disclosure provides a method of data processing. When a time query request for target data is received, backtracking can be performed step-by-step in accordance with the process of data interaction. The time-assigned timestamps time-assigned by the time stamping end before and after the target data are obtained, so that the trusted time domain of the target data can be determined. For the target data, on the basis of the actual data interaction process, by means of this step-by-step search, the respective steps in the process of determining the trusted time domain are guaranteed to be traceable, so as to be able to obtain a trusted time domain that can be used to represent the notarization time of the data.

For the defects existing in the above embodiments, they are all the results of the practice and careful study by the inventor, therefore, the discovery process of the above problems as well as the solutions proposed by the present disclosure in the following for the above problems should be the contributions made by the inventor to the present disclosure in the course of the present disclosure.

To facilitate understanding of this embodiment, a method of data processing disclosed in an embodiment of the present disclosure is first described in detail. The execution body of the method of data processing provided in embodiments of the present disclosure may be an electronic device having a certain computing power. In the present embodiment, the electronic device may be a server, wherein the server may be an independent physical server, a server cluster or a distributed system comprising a plurality of physical servers, or a cloud server providing basic cloud computing hair services such as cloud services, cloud databases, cloud computing, cloud storage, big data, and artificial intelligence platforms.

In a further implementation, the electronic device may be a terminal device or other processing device, which may be a user equipment (UE), a user terminal, a terminal, a computing device, etc., and the other processing device may be a device comprising a processor and a memory, which is not limited herein. In some possible implementations, the method of processing data may be implemented by the processor invoking computer-readable instructions stored in the memory.

A method of data processing provided in an embodiment of the present disclosure is described below.

Referring to FIG. 1, it is shown a schematic diagram of a data system according to an embodiment of the present disclosure. To assist in data storage and data management, a data system for processing data may be established. As shown in FIG. 1, the data system includes a client, a relay database, and a time stamping end. The relay database may separately implement communication connection to the client and the time stamping end.

In this specification, the client may be a trusted database created by the user. Optionally, the client may be created locally on a terminal device used by the user, or may be created based on cloud storage space. Data in the client is stored in a blockchain manner. The user may upload data to the client through a terminal such as a desktop computer, a notebook computer, or a tablet computer. The client may convert the received data into transaction data and perform upload processing on the transaction data. The client may send the transaction data that is upload-processed to the relay database, and may receive return data returned by the relay database.

In this specification, the relay database may be a trusted database that relays data between the client and the time stamping end. Data in the relay database is stored in a blockchain manner. For example, the relay database may be a trusted ledger database (LedgerDB) etc. It should be noted that the relay database has a capability of exchanging data with the time stamping end. Specifically, the relay database may convert the received transaction data into converted relay data based on a data structure matching the relay database, for example, decoding and specific encoding to obtain the converted relay data, and write the converted relay data. In addition, the relay database may further send the relay data to the time stamping end for time-assigning based on a specific sending period, and receive time-assigned data returned by the time stamping end. The relay database may convert the received time-assigned data based on a data structure matching the relay database, and write the converted return data. In addition, the relay database may return the return data to the client based on a specific return period.

In this specification, the time stamping end may be a server of an authoritative time-assigned party. The time stamping end may convert the relay data received from the relay database based on a data structure matching the time stamping end, for example, decoding and specific encoding to obtain converted data, and time-assigning a time-assigned timestamp to the converted data, and returning the time-assigned data to the relay database.

In some implementations, for the client, the client may receive transaction data uploaded by a user, perform blockchain upload processing on the transaction data to obtain a plurality of pieces of transaction data that are uploaded to a blockchain, and upload the transaction data that is uploaded to a blockchain to the relay database.

Optionally, when the client uploads the transaction data to the relay database, a digest of the transaction data may be sent to the relay database. Specifically, the digest of the transaction data may include a data name of the transaction data, a data number of the transaction data in the client, an address of the transaction data in a blockchain of the client, and the like.

In this specification, the transaction data is data generated by the user in a transaction process of the user, and data content of the transaction data is relevant to the user.

For example, the user is an e-commerce platform, and the transaction data may be an order record transacted by the e-commerce platform.

The relay database is capable of converting the received transaction data into corresponding relay data and writing the relay data into the relay database, and forwarding the relay data to the time stamping end.

Optionally, when the relay database forwards the relay data to the time stamping end, a digest of the relay data may be sent to the time stamping end. Specifically, the digest of the relay data may include a data name of the relay data, a data number of the relay data in the relay database, an address of the relay data in a blockchain of the relay database, and the like.

The time stamping end is capable of time-assigning the received relay data to obtain a time-assigned timestamp, and return time-assigned data obtained based on the relay data and the corresponding time-assigned timestamp to the relay database.

After receiving the time-assigned data returned by the time stamping end, the relay database is capable of obtain return data based on the received time-assigned data and the corresponding relay data, and write the return data into the relay database, and return the obtained return data to the client. The client may receive the return data returned by the relay database.

In some other implementations, after receiving the return data returned by the relay database, the client may further update, based on the received return data, the transaction data corresponding to the return data.

Based on the foregoing content, it may be learned that the return data is obtained based on the time-assigned data and the corresponding relay data, and the time-assigned data includes a time-assigned timestamp. Thus, the return data includes the time-assigned timestamp. Therefore, the client may determine, based on the time-assigned timestamp included in the received return data, transaction data corresponding to the time-assigned timestamp from a plurality of pieces of transaction data in the client, and then label the transaction data with the corresponding time-assigned time-stamp.

In this specification, reference may also be made to FIG. 2, which shows a schematic diagram of a data exchange process according to an embodiment of the present disclosure. As shown in FIG. 2, the client may upload the transaction data that is uploaded to a blockchain to the relay database. The relay database is capable of converting the received transaction data into corresponding relay data, and writing the relay data into the relay database, and then forwarding the relay data to the time stamping end. The time stamping end is capable of time-assigning the received relay data to obtain a time-assigned timestamp, and returning time-assigned data obtained based on the relay data and the corresponding time-assigned timestamp to the relay database. After receiving the time-assigned data returned by the time stamping end, the relay database is capable of obtaining return data based on the received time-assigned data and the corresponding relay data, and writing the return data into the relay database, and then returning the obtained return data to the client. The client may receive the return data returned by the relay database, and update the transaction data corresponding to the return data.

Please refer to FIG. 3, which shows a flowchart of a method of data processing according to an embodiment of the present disclosure. As shown in FIG. 3, the method of data processing provided in this embodiment of the present disclosure includes the following steps.

Step S301: in response to a time query request for target data, a target upload time of the target data is determined, the target data being any one of a plurality of pieces of trans-action data that are uploaded by a client to a blockchain.

In this step, the client may perform blockchain upload processing on a plurality of pieces of transaction data uploaded by the user. When receiving the time query request uploaded by the user, where the time query request includes data information and request information of the target data that needs to be queried, the target data may be selected from the plurality of pieces of transaction data based on the data information and the request information, and an upload time of the target data may be obtained.

In this specification, the data information may be infor-mation that is capable of indicating the target data. For example, the data information may include a data number of the target data, an address of the target data in a blockchain, and the like. The target data may be found from the plurality of pieces of transaction data on the chain based on the data information.

In this specification, the request information may indicate a time type that needs to be queried by the user. For example, the request information may include a preceding trusted time point, a subsequent trusted time point, a trusted period, and the like, to present a time query result matching the request information for the user subsequently.

For example, a reference may also be made to FIG. 4, which shows a schematic diagram of a data processing process according to an embodiment of the present disclo-sure. As shown in FIG. 4, the client is written with data B0-B10, a total of 11 pieces of data, and the relay database is written with data A0-A16, a total of 17 pieces of data. In this specification, the numerical sequence numbers in the client and relay databases denote the time sequences in which the data is written, and data with a small numerical sequence number is written before data with a large numeri-cal sequence number.

It should be noted that the number of pieces of data written in the client and the number of pieces of data written in the relay database shown in the figure are merely examples. The number of pieces of data written in an actual application is not limited thereto.

In this example, based on the time query request, the target data to be queried is found to be data B6 from data B0-B10 uploaded in the client, and at the same time, the target upload time of data B6 is determined to be T5.

Step S302: a first time-assigned timestamp that is time-assigned by a time stamping end to first relay data after a relay database uploads the first relay data to the time stamping end for a first time is obtain based on a time sequence in which respective pieces of transaction data are uploaded, the first relay data being uploaded by the relay database after receiving first upload data uploaded by the client, the first upload data being data sent by the client to the relay database for a first time after the target data is uploaded to a blockchain.

In this step, the time sequence in which the respective pieces of transaction are uploaded may first be determined. Based on the time sequence, data first sent by the client to the relay database after the target data is uploaded to a blockchain is determined. The data is determined as first upload data. Then, first relay data is uploaded by the relay database to the time-assigned end for the first time after receiving the first upload data uploaded by the client. Therefore, a first time-assigned timestamp of the first relay data time-assigned by the time stamping end is obtained.

In this specification, the relay database stores a plurality of pieces of relay data, and the first relay data is relay data that is first sent by the relay database to the time stamping end from the plurality of pieces of relay data after the first upload data is received.

Correspondingly, in a possible implementation, the first time-assigned timestamp may be obtained through the fol-lowing steps:

determining, for a plurality of pieces of transaction data that are uploaded to a blockchain, a time sequence in which respective pieces of transaction data among the plurality of pieces of transaction data based on upload times of respective pieces of transaction data;

determining, based on the time sequence in which respec-tive pieces of transaction data are uploaded, the first upload data from the plurality of pieces of transaction data that is first sent by the client to the relay database after the target data is uploaded to a blockchain; and determining, for a plurality of pieces of relay data stored in the relay database, first relay data that is first uploaded to the time stamping end after receiving the first upload data, based on a first sending time when the relay database sends respective pieces of relay data to the time stamping end, and determining a first time-assigned timestamp that is time-assigned by the time stamping end to the first relay data, the plurality of pieces of relay data comprising relay data obtained after processing of the first upload data by the relay database.

Specifically, after the first upload data is determined, a first sending time when the relay database sends respective pieces of relay data to the time stamping end and a second reception time when the relay database receives the first upload data may be determined. A comparison between the first sending time and the second reception time determines a first relay data first uploaded by the relay database to the time-assigned end after receiving the first upload data and determines a first time-assigned timestamp time-assigned by the time-assigned end for the first relay data.

Therefore, in some implementations, the second reception time when the relay database receives the first upload data and the first sending time corresponding to the time when the relay database sends respective stored pieces of relay data to the time stamping end may be obtained. Then, based on the obtained first sending times and the second reception time, the first target sending time in at least one first sending time after the second reception time is determined. In this specification, a time difference between the first target sending time and the second reception time is the smallest. Then, the target relay data uploaded to the time stamping end at the first target sending time is determined from the plurality of pieces of relay data. Then, the first time-assigned timestamp that is time-assigned by the time stamping end to the target relay data is obtained.

Reference may also be made to FIG. 4, wherein based on the upload sequence of the data 0 to 10 in the client, it may be determined that the first upload data first sent by the client to the relay database after data B6 is uploaded to a blockchain is data B9. Here, a time when the client sends data B9 is T6. Here, T6 is after T5. Then, for data A0 to A16 stored in the relay database, from which the relay data received to B9 can be identified as data A11, a second reception time for the relay database to receive B9 can be identified as T7. Here, T7 is after T6, and then the first target sending time after T7 with the smallest time difference from T7 can be found to be T8. Thereby, the first relay data uploaded to the time stamping end by the relay database at T8 is determined to be data A12, and thus the first time-assigned timestamp time-assigned by the time stamping end for data A12 can be obtained to be T9.

Step S303: a second time-assigned timestamp indicated by last time-assigned data received from the time stamping end before the relay database sends target return data is obtain based on first reception times of respective pieces of return data received from the relay database and the target upload time, the target return data being data last received by the client from the relay database before the target upload time.

In this step, the first reception times when the client receives the pieces of return data from the relay database may be first obtained. Then, based on the first reception times and the target upload time, the target return data last received by the client from the relay database before the target upload time is determined. Therefore, the second time-assigned timestamp indicated by the last time-assigned data received from the time stamping end before the relay database sends the target return data to the client is determined.

Correspondingly, in a possible implementation, the second time-assigned timestamp may be obtained through the following steps:

obtaining first reception times of respective pieces of return data received from the relay database, the return data being data obtained by the relay database through the relay data and a time-assigned timestamp corresponding to the relay data, the time-assigned timestamp being time data that is obtained from time-assigned data corresponding to the relay data and is received from the time stamping end;

determining, based on respective first reception times and the target upload time, the target return data that is last received by the client from the relay database before the target upload time;

obtaining third reception times corresponding to times when the relay database receives respective pieces of time-assigned data returned by the time stamping end, and a second target sending time when the relay database sends the target return data, the time-assigned data being data obtained by the time stamping end based on the received relay data and a time-assigned timestamp that is time-assigned to the relay data; and determining, based on respective ones of the obtained third reception times and second target sending time, a last time-assigned data received before the relay database sends the target return data, and a second time-assigned timestamp comprised in the last time-assigned data.

Specifically, after the third reception times corresponding to the times when the relay database receives respective pieces of time-assigned data returned by the time stamping end and the second target sending time when the relay database sends the target return data are obtained, the last time-assigned data received before the relay database sends the target return data to the client may be determined through comparison between the third reception times and the second target sending time. Therefore, the second time-assigned timestamp included in the last time-assigned data may be determined.

Therefore, in some implementations, the third target reception time in at least one third reception time before the second target sending time may be determined based on the respective third reception times obtained and the second target sending time. Here, a time difference between the third target reception time and the second target sending time is the smallest. Then, the time-assigned data sent by the time stamping end and received by the relay database at the third target reception time is determined as the last time-assigned data received. Therefore, the time-assigned timestamp included in the last time-assigned data is determined as the second time-assigned timestamp.

For example, FIG. 4 may be further referred to. Based on the first reception times when the client receives the pieces of return data from the relay database, it may be determined that the first reception time when the client last receives the target return data from the relay database before the target upload time T5 is T4. Here, T4 is before T5. In addition, it may be determined that the transaction data that receives the target return data is data B4. Therefore, it may be determined from the relay database that the target return data sent to the client is data A5, and the second target sending time when the relay database sends data A5 is T3. Here, T3 is before T4. Then, a third target reception time that is before T3 and has a smallest time difference from T3 may be found as T2. Therefore, it may be determined that the time-assigned data sent by the time stamping end and received by the relay database at T2 is determined as the last time-assigned data received. Therefore, the time-assigned timestamp included in the last time-assigned data is determined as T1.

Step S304: a trusted time domain of the target data is determined based on the first time-assigned timestamp and the second time-assigned timestamp.

In this step, after the first time-assigned timestamp and the second time-assigned timestamp are obtained, a time domain determined by using the first time-assigned timestamp as a right time endpoint, and the second time-assigned timestamp as a left time endpoint, may be determined as the trusted time domain of the target data.

In this specification, for the target data, a notarization time of the target data is not later than the first time-assigned timestamp, and the notarization time of the target data is not earlier than the second time-assigned timestamp.

For example, continuing with the foregoing example, when the first time-assigned timestamp is T9 and the second time-assigned timestamp is T1, the time domain formed including T1 as the left time endpoint and T9 as the right time endpoint may be determined as the trusted time domain of data B6.

In the method of data processing provided in this embodiment of the present disclosure, in the case where a time query request is received for the target data, backtracking can be performed step-by-step based on the chronological order according to the target upload time of the target data, the time sequence of uploading of the respective pieces of transaction data, and the reception time of the respective pieces of return data received from the relay database in accordance with the process of data interaction. The time-assigned timestamps time-assigned by the time stamping end before and after the target data are obtained, so that the trusted time domain of the target data can be determined. For the target data, on the basis of the actual data interaction process, by means of this step-by-step search, the respective steps in the process of determining the trusted time domain are guaranteed to be traceable, so as to be able to obtain a trusted time domain that can be used to represent the notarization time of the data.

Furthermore, a degree of association between a determined time-assigned timestamp and the target data can be improved, and strictness and credibility of the trusted time domain can be effectively improved.

Referring to FIG. 5, which shows a flowchart of a further method of data processing according to an embodiment of the present disclosure. As shown in FIG. 5, the method of data processing provided in this embodiment of the present disclosure includes the following steps.

Step S501: in response to a time query request for target data, a target upload time of the target data is determined, the target data being any one of a plurality of pieces of transaction data that are uploaded by a client to a blockchain.

Step S502: a first time-assigned timestamp that is time-assigned by a time stamping end to first relay data after a relay database uploads the first relay data to the time stamping end for a first time is obtain based on a time sequence in which respective pieces of transaction data are uploaded, the first relay data being uploaded by the relay database after receiving first upload data uploaded by the client, the first upload data being data sent by the client to the relay database for a first time after the target data is uploaded to a blockchain.

Step S503: a second time-assigned timestamp indicated by last time-assigned data received from the time stamping end before the relay database sends target return data is obtain based on first reception times of respective pieces of return data received from the relay database and the target upload time, the target return data being data last received by the client from the relay database before the target upload time.

Step S504: a trusted time domain of the target data is determined based on the first time-assigned timestamp and the second time-assigned timestamp.

For descriptions of Step S501 to Step S504, refer to descriptions of Step S301 to Step S304. The same technical effects can be implemented, and the same technical problems can be solved. Details are not described herein again.

Step S505: a time query result corresponding to the time query request for a user is presented based on the trusted time domain, the time query result comprising one or more of the following: a preceding trusted time point, a subsequent trusted time point, and a trusted period.

In this step, when the trusted time domain of the target data is determined, a time query result corresponding to request information indicated by the time query request may be presented for the user based on the request information.

Optionally, the request information indicated by the time query request may be a preceding trusted time point of the query target data, a subsequent trusted time point of the query target data, or a trusted time period of the query target data.

Correspondingly, in some embodiments, when the request information indicated by the time query request is a preceding trusted time point for querying the target data, the second time-assigned timestamp may be presented as the preceding trusted time point.

In some other embodiments, when the request information indicated by the time query request is a subsequent trusted time point for querying the target data, the first time-assigned timestamp may be presented as the subsequent trusted time point.

In other embodiments, when the request information indicated by the time query request is a trusted time period for querying the target data, the trusted time domain may be presented as the trusted time period.

Persons skilled in the art may understand that, in the foregoing method in the specific implementation, an order of writing the steps does not mean a strict execution order, and does not constitute any limitation on an implementation process. A specific execution order of the steps should be determined based on functions and a possible internal logic of the steps.

In the method of data processing provided in this embodiment of the present disclosure, in the case where a time query request is received for the target data, backtracking can be performed step-by-step based on the chronological order according to the target upload time of the target data, the time sequence of uploading of the respective pieces of transaction data, and the reception time of the respective pieces of return data received from the relay database in accordance with the process of data interaction. The time-assigned timestamps time-assigned by the time stamping end before and after the target data are obtained, so that the trusted time domain of the target data can be determined. For the target data, on the basis of the actual data interaction process, by means of this step-by-step search, the respective steps in the process of determining the trusted time domain are guaranteed to be traceable, so as to be able to obtain a trusted time domain that can be used to represent the notarization time of the data.

Furthermore, a degree of association between a determined time-assigned timestamp and the target data can be improved, and strictness and credibility of the trusted time domain can be effectively improved.

Based on the same inventive concept, an embodiment of the present disclosure further provides an apparatus for data processing corresponding to the method of data processing. Since a principle of solving a problem in the apparatus in this embodiment of the present disclosure is similar to that of the method of data processing in the foregoing embodiment of the present disclosure, implementation of the apparatus may refer to implementation of the method. Details that are not described again are not repeated.

Figure 7:
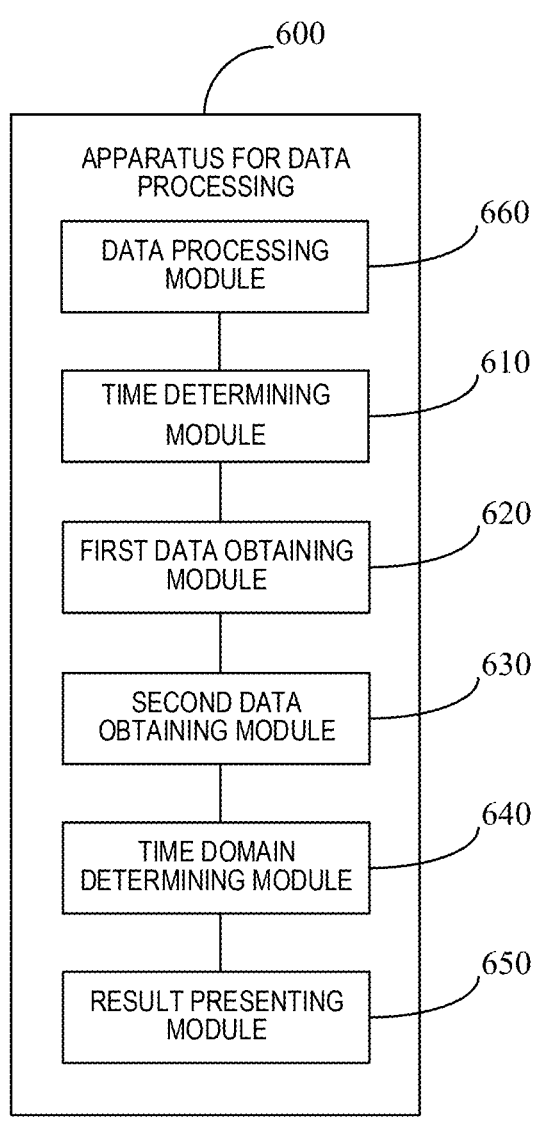
FIG. 7 is a schematic diagram of an apparatus for data processing according to an embodiment of the present disclosure.

Referring to FIG. 6 and FIG. 7, FIG. 6 shows one of the schematic diagrams of an apparatus for data processing according to an embodiment of the present disclosure. FIG. 7 shows two of the schematic diagrams of an apparatus for data processing according to an embodiment of the present disclosure. The apparatus for data processing provided in this embodiment of the present disclosure is applied to the foregoing client. The apparatus for data processing may be a same apparatus with a different name from the client. The apparatus for data processing may also be a part of the client. A module in the apparatus for data processing and a component with a corresponding function in the client may be coupled to implement a same function. As shown in FIG. 6, the apparatus for data processing 600 provided in this embodiment of the present disclosure includes:

a time determining module 610 configured to, in response to a time query request for target data, determine a target upload time of the target data, the target data being any one of a plurality of pieces of transaction data that are uploaded by a client to a blockchain;

a first data obtaining module 620 configured to obtain, based on a time sequence in which respective pieces of transaction data are uploaded, a first time-assigned timestamp that is time-assigned by a time stamping end to first relay data after a relay database uploads the first relay data to the time stamping end for a first time, the first relay data being uploaded by the relay database after receiving first upload data uploaded by the client, the first upload data being data sent by the client to the relay database for a first time after the target data is uploaded to a blockchain;

a second data obtaining module 630 configured to obtain, based on first reception times of respective pieces of return data received from the relay database and the target upload time, a second time-assigned timestamp indicated by last time-assigned data received from the time stamping end before the relay database sends target return data, the target return data being data last received by the client from the relay database before the target upload time; and a time domain determining module 640 configured to determine a trusted time domain of the target data based on the first time-assigned timestamp and the second time-assigned timestamp.

In an optional implementation, the first data obtaining module 620 is specifically configured to:

determine, for a plurality of pieces of transaction data that are uploaded to a blockchain, a time sequence in which respective pieces of transaction data among the plurality of pieces of transaction data based on upload times of respective pieces of transaction data;

determine, based on the time sequence in which respective pieces of transaction data are uploaded, the first upload data from the plurality of pieces of transaction data that is first sent by the client to the relay database after the target data is uploaded to a blockchain; and determine, for a plurality of pieces of relay data stored in the relay database, first relay data that is first uploaded to the time stamping end after receiving the first upload data, based on a first sending time when the relay database sends respective pieces of relay data to the time stamping end, and determining a first time-assigned timestamp that is time-assigned by the time stamping end to the first relay data, the plurality of pieces of relay data comprising relay data obtained after processing of the first upload data by the relay database.

In an optional implementation, when the first data obtaining module 620 is configured to determine first relay data that is first uploaded to the time stamping end after receiving the first upload data, based on a first sending time when the relay database sends respective pieces of relay data to the time stamping end, and determining a first time-assigned timestamp that is time-assigned by the time stamping end to the first relay data, the first data obtaining module 620 is specifically configured to:

obtain a second reception time when the relay database receives the first upload data and the first sending time corresponding to a time when the relay database sends respective pieces of stored relay data to the time stamping end;

determine, based on respective ones of the obtained first sending times and second reception time, a first target sending time in at least one first sending time after the second reception time, a time difference between the first target sending time and the second reception time being the smallest;

determine, from the plurality of pieces of relay data, first relay data uploaded to the time stamping end at the first target sending time; and obtain the first time-assigned timestamp that is time-assigned by the time stamping end to the first relay data.

In an optional implementation, the second data obtaining module 630 is specifically configured to:

obtain first reception times of respective pieces of return data received from the relay database, the return data being data obtained by the relay database through the relay data and a time-assigned timestamp corresponding to the relay data, the time-assigned timestamp being time data that is obtained from time-assigned data corresponding to the relay data and is received from the time stamping end;

determine, based on respective first reception times and the target upload time, the target return data that is last received by the client from the relay database before the target upload time;

obtain third reception times corresponding to times when the relay database receives respective pieces of time-assigned data returned by the time stamping end, and a second target sending time when the relay database sends the target return data, the time-assigned data being data obtained by the time stamping end based on the received relay data and a time-assigned timestamp that is time-assigned to the relay data; and determine, based on respective ones of the obtained third reception times and second target sending time, a last time-assigned data received before the relay database sends the target return data, and a second time-assigned timestamp comprised in the last time-assigned data.

In an optional implementation, when the second data obtaining module 630 is configured to determine, based on respective ones of the obtained third reception times and second target sending time, a last time-assigned data received before the relay database sends the target return data, and a second time-assigned timestamp comprised in the last time-assigned data, the second data obtaining module 630 is specifically configured to:

determine, based on respective ones of the obtained third reception times and second target sending time, a third target reception time in at least one third reception time before the second target sending time, a time difference between the third target reception time and the second target sending time being the smallest;

determine time-assigned data sent by the time stamping end and received by the relay database at the third target reception time as the last time-assigned data received; and determine the second time-assigned timestamp comprised in the last time-assigned data.

In an optional implementation, as shown in FIG. 7, the apparatus further includes a result presenting module 650 configured to:

present, based on the trusted time domain, a time query result corresponding to the time query request for a user, the time query result comprising one or more of the following: a preceding trusted time point, a subsequent trusted time point, and a trusted period.

In an optional implementation, as shown in FIG. 7, the apparatus further includes a data processing module 660 configured to:

receive transaction data uploaded by a user;

perform blockchain upload processing on the transaction data to obtain a plurality of pieces of transaction data that is uploaded to a blockchain;

upload transaction data that performs blockchain uploading to the relay database, the relay database being capable of converting the received transaction data into corresponding relay data and writing the relay data into the relay database, and forwarding the relay data to the time stamping end, the time stamping end being capable of time-assigning to the received relay data to obtain a time-assigned timestamp, and returning time-assigned data obtained through the relay data and the corresponding time-assigned timestamp to the relay database, and after receiving the time-assigned data returned by the time stamping end, the relay database being capable of obtaining return data based on the received time-assigned data and the corresponding relay data, writing the return data into the relay database, and returning the obtained return data to the client; and receive the return data returned by the relay database.

In an optional implementation, the data processing module 660 is further configured to:

update, based on the received return data, transaction data corresponding to the return data.

In some embodiments, a function or a module included in the apparatus provided in this embodiment of the present disclosure may be configured to perform the method described in the foregoing method embodiment, and a specific implementation may refer to the description of the foregoing method embodiment. To avoid repetition, details are not described herein again.

In the apparatus for data processing provided in this embodiment of the present disclosure, in the case where a time query request is received for the target data, backtracking can be performed step-by-step based on the chronological order according to the target upload time of the target data, the time sequence of uploading of the respective pieces of transaction data, and the reception time of the respective pieces of return data received from the relay database in accordance with the process of data interaction. The time-assigned timestamps time-assigned by the time stamping end before and after the target data are obtained, so that the trusted time domain of the target data can be determined. For the target data, on the basis of the actual data interaction process, by means of this step-by-step search, the respective steps in the process of determining the trusted time domain are guaranteed to be traceable, so as to be able to obtain a trusted time domain that can be used to represent the notarization time of the data.

Furthermore, a degree of association between a determined time-assigned timestamp and the target data can be improved, and strictness and credibility of the trusted time domain can be effectively improved.

Figure 8:
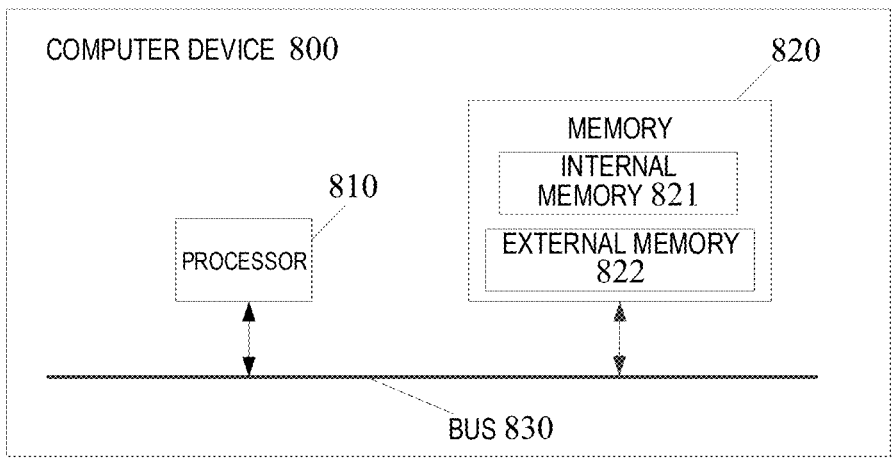
FIG. 8 is a schematic diagram of a structure of an electronic device according to an embodiment of the present disclosure.

Corresponding to the foregoing method of data processing, the embodiment of the present disclosure further provides an electronic device 800. As shown in FIG. 8, which shows a schematic diagram of a structure of the electronic device 800 according to an embodiment of the present disclosure, including:

a processor 810, a memory 820, and a bus 830; the memory 820 is configured to store an execution instruction and includes a memory 821 and an external memory 822; the memory 821 is also referred to as an internal memory, and is configured to temporarily store operation data in the processor 810 and data exchanged with an external memory 822 such as a hard disk. The processor 810 exchanges data with the external memory 822 through the memory 821. When the computer device 800 is running, the processor 810 communicates with the memory 820 through the bus 830, so that the processor 810 can execute the steps of the method of data processing described in the foregoing method embodiment.

This embodiment of the present disclosure further provides a computer-readable storage medium having a computer program stored thereon, the computer program, when executed by a processor, performing the steps of the foregoing method embodiment. The storage medium may be a volatile or non-volatile computer-readable storage medium.

This embodiment of the present disclosure further provides a computer program product including computer instructions, the computer instructions, when executed by a processor, may perform the steps of the method of data processing described in the above method embodiments, as may be specified in the above method embodiments, which will not be further described herein.

In this specification, the computer program product may be specifically implemented by hardware, software, or a combination thereof. In an optional embodiment, the computer program product is specifically embodied as a computer storage medium. In a further optional embodiment, the computer program product is specifically embodied as a software product, such as a software development kit (SDK), or the like.

Persons skilled in the art may clearly understand that, for the convenience and brevity of description, a specific working process of the foregoing described device and apparatus may refer to a corresponding process in the foregoing method embodiments, and details are not described herein again. In the several embodiments provided in the present disclosure, it should be understood that the disclosed device, apparatus, and method may be implemented in other manners. The foregoing apparatus embodiments are merely illustrative. For example, the division of the units is merely logical function division, and there may be a further division manner in actual implementation. For example, a plurality of units or components may be combined or integrated into a further system, or some features may be ignored or not performed. A further point is that the presented or discussed mutual couplings, direct couplings, or communication connections may be implemented through some interfaces. The indirect couplings or communication connections between the apparatuses or units may be implemented in electrical, mechanical, or other forms.

The units illustrated as separated components may or may not be physically separated, and components shown as units may or may not be physical units, i.e., they may be located in one place, or they may be distributed to a plurality of network units. Some or all of these units may be selected to fulfill the purpose of this embodiment of the program according to actual needs.

In addition, the functional units in the embodiments of the present disclosure may be integrated into one processing unit, or respective of the units may exist alone physically, or two or more units may be integrated into one unit.

If the function is implemented in the form of a software functional unit and sold or used as an independent product, the function may be stored in a non-volatile computer-readable storage medium executable by a processor. Based on such an understanding, the technical solutions of the present disclosure are essentially, or the part contributing to the prior art, or the part of the technical solutions may be embodied in the form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: various media that can store program code, such as a USB flash drive, a mobile hard disk, a read-only memory (ROM), a random access memory (RAM), a magnetic disk, or an optical disc.

Finally, it should be noted that the foregoing embodiments are merely specific implementations of the present disclosure and are used to illustrate the technical solutions of the present disclosure, but not to limit the present disclosure. The scope of protection of the present disclosure is not limited thereto. Although the present disclosure is described in detail with reference to the foregoing embodiments, persons of ordinary skill in the art should understand that: any person skilled in the art can still modify the technical solutions described in the foregoing embodiments or can easily conceive changes to the technical solutions, or can make equivalent replacements for some technical features; however, these modifications, changes, or replacements do not cause the essence of the corresponding technical solutions to depart from the spirit and scope of the technical solutions of the embodiments of the present disclosure, and all should fall within the scope of protection of the present disclosure. Therefore, the scope of protection of the present disclosure shall be subject to the scope of protection of the claims.

What is claimed is:

1. A method of data processing, comprising:
in response to a time query request for target data, determining a target upload time of the target data, the target data being any one of a plurality of pieces of transaction data that are uploaded by a client to a blockchain;
obtaining, based on a time sequence in which respective pieces of transaction data are uploaded, a first time-assigned timestamp that is assigned by a time stamping end to first relay data after a relay database uploads the first relay data to the time stamping end for a first time, the first relay data being uploaded by the relay database after receiving first upload data uploaded by the client, the first upload data being data sent by the client to the relay database for a first time after the target data is uploaded to the blockchain;
obtaining, based on first reception times of respective pieces of return data received from the relay database and the target upload time, a second time-assigned timestamp indicated by last time-assigned data received from the time stamping end before the relay database sends target return data, the target return data being data last received by the client from the relay database before the target upload time; and
determining a trusted time domain of the target data based on the first time-assigned timestamp and the second time-assigned timestamp,
wherein after determining a trusted time domain of the target data based on the first time-assigned timestamp and the second time-assigned timestamp, the method further comprises:
presenting, based on the trusted time domain, a time query result corresponding to the time query request for a user,
the time query result comprising one or more of the following: a preceding trusted time point, a subsequent trusted time point, and a trusted period.

2. The method of claim 1, wherein obtaining, based on a time sequence in which respective pieces of transaction data are uploaded, a first time-assigned timestamp that is assigned by a time stamping end to first relay data after a relay database uploads the first relay data to the time stamping end for a first time, the first relay data being uploaded by the relay database after receiving first upload data uploaded by the client comprises:
determining, for a plurality of pieces of transaction data that are uploaded to the blockchain, a time sequence in which respective pieces of transaction data among the plurality of pieces of transaction data based on upload times of respective pieces of transaction data;
determining, based on the time sequence in which respective pieces of transaction data are uploaded, the first upload data from the plurality of pieces of transaction data that is first sent by the client to the relay database after the target data is uploaded to the blockchain; and
determining, for a plurality of pieces of relay data stored in the relay database, first relay data that is first uploaded to the time stamping end after receiving the first upload data, based on a first sending time when the relay database sends respective pieces of relay data to the time stamping end, and determining a first time-assigned timestamp that is assigned by the time stamping end to the first relay data, the plurality of pieces of relay data comprising relay data obtained after processing of the first upload data by the relay database.

3. The method of claim 2, wherein determining first relay data that is first uploaded to the time stamping end after receiving the first upload data, based on a first sending time when the relay database sends respective pieces of relay data to the time stamping end, and determining a first time-assigned timestamp that is assigned by the time stamping end to the first relay data comprises:
obtaining a second reception time when the relay database receives the first upload data and the first sending time corresponding to a time when the relay database sends respective pieces of stored relay data to the time stamping end;
determining, based on respective ones of the obtained first sending times and second reception time, a first target sending time in at least one first sending time after the second reception time, a time difference between the first target sending time and the second reception time being the smallest;
determining, from the plurality of pieces of relay data, first relay data uploaded to the time stamping end at the first target sending time; and obtaining the first time-assigned timestamp that is assigned by the time stamping end to the first relay data.

4. The method of claim 1, wherein obtaining, based on first reception times of respective pieces of return data received from the relay database and the target upload time, a second time-assigned timestamp indicated by last time-assigned data received from the time stamping end before the relay database sends target return data comprises:

obtaining first reception times of respective pieces of return data received from the relay database, the return data being data obtained by the relay database through the relay data and a time-assigned timestamp corresponding to the relay data, the time-assigned timestamp being time data that is obtained from time-assigned data corresponding to the relay data and is received from the time stamping end;

determining, based on respective first reception times and the target upload time, the target return data that is last received by the client from the relay database before the target upload time;

obtaining third reception times corresponding to times when the relay database receives respective pieces of time-assigned data returned by the time stamping end, and a second target sending time when the relay database sends the target return data, the time-assigned data being data obtained by the time stamping end based on the received relay data and a time-assigned timestamp that is time-assigned to the relay data; and determining, based on respective ones of the obtained third reception times and second target sending time, a last time-assigned data received before the relay database sends the target return data, and a second time-assigned timestamp comprised in the last time-assigned data.

5. The method of claim 4, wherein determining, based on respective ones of the obtained third reception times and second target sending time, a last time-assigned data received before the relay database sends the target return data, and a second time-assigned timestamp comprised in the last time-assigned data comprises:

determining, based on respective ones of the obtained third reception times and second target sending time, a third target reception time in at least one third reception time before the second target sending time, a time difference between the third target reception time and the second target sending time being the smallest;

determining time-assigned data sent by the time stamping end and received by the relay database at the third target reception time as the last time-assigned data received; and determining the second time-assigned timestamp comprised in the last time-assigned data.

6. The method of claim 1, wherein the method further comprises:

receiving transaction data uploaded by a user;

performing blockchain upload processing on the transaction data to obtain a plurality of pieces of transaction data that is uploaded to the blockchain;

uploading transaction data that performs blockchain uploading to the relay database, the relay database being capable of converting the received transaction data into corresponding relay data and writing the relay data into the relay database, and forwarding the relay data to the time stamping end, the time stamping end being capable of time-assigning to the received relay data to obtain a time-assigned timestamp, and returning time-assigned data obtained through the relay data and the corresponding time-assigned timestamp to the relay database, and after receiving the time-assigned data returned by the time stamping end, the relay database being capable of obtaining return data based on the received time-assigned data and the corresponding relay data, writing the return data into the relay database, and returning the obtained return data to the client; and receiving the return data returned by the relay database.

7. The method of claim 6, wherein after receiving the return data returned by the relay database, the method further comprises:

updating, based on the received return data, transaction data corresponding to the return data.

8. An electronic device comprising: a processor, a memory, and a bus, the memory storing machine-readable instructions executable by the processor, when the electronic device is running, the processor communicating with the memory through the bus, and the machine-readable instructions, when executed by the processor, performing acts comprising:

in response to a time query request for target data, determining a target upload time of the target data, the target data being any one of a plurality of pieces of transaction data that are uploaded by a client to a blockchain;

obtaining, based on a time sequence in which respective pieces of transaction data are uploaded, a first assigned timestamp that is assigned by a time stamping end to first relay data after a relay database uploads the first relay data to the time stamping end for a first time, the first relay data being uploaded by the relay database after receiving first upload data uploaded by the client, the first upload data being data sent by the client to the relay database for a first time after the target data is uploaded to the blockchain;

obtaining, based on first reception times of respective pieces of return data received from the relay database and the target upload time, a second assigned timestamp indicated by last assigned data received from the time stamping end before the relay database sends target return data, the target return data being data last received by the client from the relay database before the target upload time; and determining a trusted time domain of the target data based on the first assigned timestamp and the second assigned timestamp, wherein after determining a trusted time domain of the target data based on the first time-assigned timestamp and the second time-assigned timestamp, the processor performing further acts comprising:

presenting, based on the trusted time domain, a time query result corresponding to the time query request for a user, the time query result comprising one or more of the following: a preceding trusted time point, a subsequent trusted time point, and a trusted period.

9. A non-transitory computer-readable storage medium having a computer program stored thereon, the computer program, when executed by a processor, performing acts performing:

in response to a time query request for target data, determining a target upload time of the target data, the target data being any one of a plurality of pieces of transaction data that are uploaded by a client to a blockchain;

obtaining, based on a time sequence in which respective pieces of transaction data are uploaded, a first assigned timestamp that is assigned by a time stamping end to first relay data after a relay database uploads the first relay data to the time stamping end for a first time, the first relay data being uploaded by the relay database after receiving first upload data uploaded by the client, the first upload data being data sent by the client to the relay database for a first time after the target data is uploaded to the blockchain;

obtaining, based on first reception times of respective pieces of return data received from the relay database and the target upload time, a second assigned timestamp indicated by last assigned data received from the time stamping end before the relay database sends target return data, the target return data being data last received by the client from the relay database before the target upload time;

determining a trusted time domain of the target data based on the first assigned timestamp and the second assigned timestamp; and after determining a trusted time domain of the target data based on the first time-assigned timestamp and the second time-assigned timestamp, presenting, based on the trusted time domain, a time query result corresponding to the time query request for a user, the time query result comprising one or more of the following: a preceding trusted time point, a subsequent trusted time point, and a trusted period.

10. The electronic device of claim 8, wherein obtaining, based on a time sequence in which respective pieces of transaction data are uploaded, a first assigned timestamp that is assigned by a time stamping end to first relay data after a relay database uploads the first relay data to the time stamping end for a first time, the first relay data being uploaded by the relay database after receiving first upload data uploaded by the client comprises:

determining, for a plurality of pieces of transaction data that are uploaded to the blockchain, a time sequence in which respective pieces of transaction data among the plurality of pieces of transaction data based on upload times of respective pieces of transaction data;

determining, based on the time sequence in which respective pieces of transaction data are uploaded, the first upload data from the plurality of pieces of transaction data that is first sent by the client to the relay database after the target data is uploaded to the blockchain; and determining, for a plurality of pieces of relay data stored in the relay database, first relay data that is first uploaded to the time stamping end after receiving the first upload data, based on a first sending time when the relay database sends respective pieces of relay data to the time stamping end, and determining a first assigned timestamp that is assigned by the time stamping end to the first relay data, the plurality of pieces of relay data comprising relay data obtained after processing of the first upload data by the relay database.

11. The electronic device of claim 10, wherein determining first relay data that is first uploaded to the time stamping end after receiving the first upload data, based on a first sending time when the relay database sends respective pieces of relay data to the time stamping end, and determining a first assigned timestamp that is assigned by the time stamping end to the first relay data comprises:

obtaining a second reception time when the relay database receives the first upload data and the first sending time corresponding to a time when the relay database sends respective pieces of stored relay data to the time stamping end;

determining, based on respective ones of the obtained first sending times and second reception time, a first target sending time in at least one first sending time after the second reception time, a time difference between the first target sending time and the second reception time being the smallest;

determining, from the plurality of pieces of relay data, first relay data uploaded to the time stamping end at the first target sending time; and obtaining the first assigned timestamp that is assigned by the time stamping end to the first relay data.

12. The electronic device of claim 8, wherein obtaining, based on first reception times of respective pieces of return data received from the relay database and the target upload time, a second assigned timestamp indicated by last assigned data received from the time stamping end before the relay database sends target return data comprises:

obtaining first reception times of respective pieces of return data received from the relay database, the return data being data obtained by the relay database through the relay data and an assigned timestamp corresponding to the relay data, the assigned timestamp being time data that is obtained from assigned data corresponding to the relay data and is received from the time stamping end;

determining, based on respective first reception times and the target upload time, the target return data that is last received by the client from the relay database before the target upload time;

obtaining third reception times corresponding to times when the relay database receives respective pieces of assigned data returned by the time stamping end, and a second target sending time when the relay database sends the target return data, the assigned data being data obtained by the time stamping end based on the received relay data and a timestamp that is time-assigned to the relay data; and determining, based on respective ones of the obtained third reception times and second target sending time, a last assigned data received before the relay database sends the target return data, and a second assigned timestamp comprised in the last assigned data.

13. The electronic device of claim 12, wherein determining, based on respective ones of the obtained third reception times and second target sending time, a last assigned data received before the relay database sends the target return data, and a second assigned timestamp comprised in the last assigned data comprises:

determining, based on respective ones of the obtained third reception times and second target sending time, a third target reception time in at least one third reception time before the second target sending time, a time difference between the third target reception time and the second target sending time being the smallest;

determining assigned data sent by the time stamping end and received by the relay database at the third target reception time as the last assigned data received; and determining the second assigned timestamp comprised in the last assigned data.

14. The electronic device of claim 8, wherein the method further comprises:

receiving transaction data uploaded by a user;

performing blockchain upload processing on the transaction data to obtain a plurality of pieces of transaction data that is uploaded to the blockchain;

uploading transaction data that performs blockchain uploading to the relay database, the relay database being capable of converting the received transaction data into corresponding relay data and writing the relay data into the relay database, and forwarding the relay data to the time stamping end, the time stamping end being capable of time-assigning to the received relay data to obtain a assigned timestamp, and returning assigned data obtained through the relay data and the corresponding assigned timestamp to the relay database, and after receiving the assigned data returned by the time stamping end, the relay database being capable of obtaining return data based on the received assigned data and the corresponding relay data, writing the return data into the relay database, and returning the obtained return data to the client; and receiving the return data returned by the relay database.

15. The electronic device of claim 14, wherein after receiving the return data returned by the relay database, the method further comprises:

updating, based on the received return data, transaction data corresponding to the return data.

16. The non-transitory computer-readable storage medium of claim 9, wherein obtaining, based on a time sequence in which respective pieces of transaction data are uploaded, a first assigned timestamp that is assigned by a time stamping end to first relay data after a relay database uploads the first relay data to the time stamping end for a first time, the first relay data being uploaded by the relay database after receiving first upload data uploaded by the client comprises:

determining, for a plurality of pieces of transaction data that are uploaded to the blockchain, a time sequence in which respective pieces of transaction data among the plurality of pieces of transaction data based on upload times of respective pieces of transaction data;

determining, based on the time sequence in which respective pieces of transaction data are uploaded, the first upload data from the plurality of pieces of transaction data that is first sent by the client to the relay database after the target data is uploaded to the blockchain; and determining, for a plurality of pieces of relay data stored in the relay database, first relay data that is first uploaded to the time stamping end after receiving the first upload data, based on a first sending time when the relay database sends respective pieces of relay data to the time stamping end, and determining a first assigned timestamp that is assigned by the time stamping end to the first relay data, the plurality of pieces of relay data comprising relay data obtained after processing of the first upload data by the relay database.

17. The non-transitory computer-readable storage medium of claim 16, wherein determining first relay data that is first uploaded to the time stamping end after receiving the first upload data, based on a first sending time when the relay database sends respective pieces of relay data to the time stamping end, and determining a first assigned timestamp that is assigned by the time stamping end to the first relay data comprises:

obtaining a second reception time when the relay database receives the first upload data and the first sending time corresponding to a time when the relay database sends respective pieces of stored relay data to the time stamping end;

determining, based on respective ones of the obtained first sending times and second reception time, a first target sending time in at least one first sending time after the second reception time, a time difference between the first target sending time and the second reception time being the smallest;

determining, from the plurality of pieces of relay data, first relay data uploaded to the time stamping end at the first target sending time; and obtaining the first assigned timestamp that is assigned by the time stamping end to the first relay data.

18. The non-transitory computer-readable storage medium of claim 9, wherein obtaining, based on first reception times of respective pieces of return data received from the relay database and the target upload time, a second assigned timestamp indicated by last assigned data received from the time stamping end before the relay database sends target return data comprises:

obtaining first reception times of respective pieces of return data received from the relay database, the return data being data obtained by the relay database through the relay data and an assigned timestamp corresponding to the relay data, the assigned timestamp being time data that is obtained from assigned data corresponding to the relay data and is received from the time stamping end;

determining, based on respective first reception times and the target upload time, the target return data that is last received by the client from the relay database before the target upload time;

obtaining third reception times corresponding to times when the relay database receives respective pieces of assigned data returned by the time stamping end, and a second target sending time when the relay database sends the target return data, the assigned data being data obtained by the time stamping end based on the received relay data and a timestamp that is time-assigned to the relay data; and determining, based on respective ones of the obtained third reception times and second target sending time, a last assigned data received before the relay database sends the target return data, and a second assigned timestamp comprised in the last assigned data.

* * * * *